(12) United States Patent
Himmelmann

(10) Patent No.: US 12,055,156 B2
(45) Date of Patent: Aug. 6, 2024

(54) HIGH SPEED TURBO-ALTERNATOR WITH INTEGRATED COOLING FAN

(71) Applicant: Hamilton Sundstrand Corporation, Charlotte, NC (US)

(72) Inventor: Richard A. Himmelmann, Beloit, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 196 days.

(21) Appl. No.: 17/711,661

(22) Filed: Apr. 1, 2022

(65) Prior Publication Data

US 2023/0313812 A1 Oct. 5, 2023

(51) Int. Cl.
*F04D 29/26* (2006.01)
*F04D 17/16* (2006.01)
*F04D 29/056* (2006.01)
*F04D 29/28* (2006.01)

(52) U.S. Cl.
CPC ........... *F04D 29/263* (2013.01); *F04D 17/16* (2013.01); *F04D 29/056* (2013.01); *F04D 29/282* (2013.01)

(58) Field of Classification Search
CPC .......... F01D 5/147; F01D 15/10; F01D 5/048; F02C 1/02; F04D 17/16; F04D 29/282; F04D 29/266; F04D 29/263; F04D 29/056; F04D 29/284
See application file for complete search history.

(56) References Cited

U.S. PATENT DOCUMENTS

| | | | |
|---|---|---|---|
| 1,028,963 | A | 6/1912 | Powell et al. |
| 5,547,350 | A | 8/1996 | Rawal et al. |
| 6,784,565 | B2 | 8/2004 | Wall et al. |
| 6,983,604 | B1 * | 1/2006 | Tafoya ............... F02C 3/16 60/39.35 |
| 2003/0217548 | A1 | 11/2003 | Sekihara et al. |
| 2020/0325904 | A1 | 10/2020 | Himmelmann |

FOREIGN PATENT DOCUMENTS

| | | | |
|---|---|---|---|
| CN | 214887730 U | 11/2021 | |
| DE | 19523661 A1 * | 1/1997 | ......... F04D 13/0646 |
| DE | 19523661 A1 | 1/1997 | |
| EP | 4191067 A1 | 6/2023 | |
| WO | 2016184409 A1 | 11/2016 | |

OTHER PUBLICATIONS

DE-19523661-A1 English Translation (Year: 1997).*
Abstract for DE19523661 (A1), Published: 1997-01-02, 1 page.
Abstract of CN214887730 (U), Published: 2021-11-26, 1 page.
European Search Report for Application No. 23165698.4, mailed Aug. 25, 2023, 8 pages.

* cited by examiner

*Primary Examiner* — Anthony Ayala Delgado
(74) *Attorney, Agent, or Firm* — CANTOR COLBURN LLP

(57) ABSTRACT

A blower including: a forward end; an aft end located opposite the forward end; a shaft located at the aft end; a flange located at the forward end; an internal surface defining an axial passageway within the blower; an external surface radially outward of the internal surface; one or more radial passageway formed within the flange and fluidly connected to the axial passageway, the radial passageway extending from the internal surface to the external surface; and a plurality of blower blades located within the flange and defining the radial passageway.

17 Claims, 5 Drawing Sheets

HIGH SPEED TURBO-ALTERNATOR WITH INTEGRATED COOLING FAN

BACKGROUND

The embodiments herein generally relate to electrical power generation systems and more specifically, inlet cooling fans for use in the electrical power generation system.

Some systems, such as unmanned aerial vehicles (UAV's) or the like often utilize electrical power for propulsion and operation of onboard systems. Some such systems, such as medium-sized UAV's that require power levels in the range of about 1 KW to 30 KW, have relatively short mission times because the energy density of batteries is far too low to effectively work in this power range, and conventional internal combustion engines and jet engines are very inefficient at these low power levels. One option that has been developed is a tethered UAV system in which the UAV is connected to a power source on the ground by a tether. Use of a tethered UAV allows for an increase in mission duration time, but reduces an operating height and distance in which the UAV may operate, due to the constraint of the tether. An untethered efficient power source that is lightweight with a high power density is greatly desired

BRIEF SUMMARY

According to one embodiment, a blower is provided. The blower including: a forward end; an aft end located opposite the forward end; a shaft located at the aft end; a flange located at the forward end; an internal surface defining an axial passageway within the blower; an external surface radially outward of the internal surface; one or more radial passageway formed within the flange and fluidly connected to the axial passageway, the radial passageway extending from the internal surface to the external surface; and a plurality of blower blades located within the flange and defining the radial passageway.

In addition to one or more of the features described above, or as an alternative, further embodiments may include that the flange further includes: a forward disc located at the forward end; and an aft disc connected to the shaft, the second flange being in a facing spaced relationship at least partially defining the one or more radial passageways therebetween.

In addition to one or more of the features described above, or as an alternative, further embodiments may include that each of the plurality of blower blades extend from the first forward flange to the second forward flange.

In addition to one or more of the features described above, or as an alternative, further embodiments may include that each of the plurality of blower blades extend from the internal surface to the external surface.

In addition to one or more of the features described above, or as an alternative, further embodiments may include that the axial passageway is located at the forward end and extends into the blower.

In addition to one or more of the features described above, or as an alternative, further embodiments may include that the axial passageway extends from the forward end to the aft end.

In addition to one or more of the features described above, or as an alternative, further embodiments may include a seat located in the axial passageway.

In addition to one or more of the features described above, or as an alternative, further embodiments may include that the forward disc further includes a forward surface and the aft disc further includes an aft surface. The forward surface is a thrust bearing runner for the first forward thrust bearing. The aft surface is a thrust bearing runner for the second forward thrust bearing.

According to another embodiment, an electrical power generation system is provided. The electrical power generation system includes: a micro-turbine alternator, including: a decomposition chamber; a turbine driven by combustion gases from the decomposition chamber; a blower operably connected to the decomposition chamber to provide a blown airflow thereto; one or more shafts connecting the turbine to the blower such that rotation of the turbine drives rotation of the blower; and an electric generator disposed along the one or more shafts such that electrical power is generated via rotation of the one or more shafts, the blower includes a forward end; an aft end located opposite the forward end; a shaft located at the aft end; a flange located at the forward end; an internal surface defining an axial passageway within the blower; an external surface radially outward of the internal surface; one or more radial passageway formed within the flange and fluidly connected to the axial passageway, the radial passageway extending from the internal surface to the external surface; and a plurality of blower blades located within the flange and defining the radial passageway.

In addition to one or more of the features described above, or as an alternative, further embodiments may include that the flange further includes: a forward disc located at the forward end; and an aft disc connected to the shaft, the second flange being in a facing spaced relationship at least partially defining the one or more radial passageways therebetween.

In addition to one or more of the features described above, or as an alternative, further embodiments may include that each of the plurality of blower blades extend from the first forward flange to the second forward flange.

In addition to one or more of the features described above, or as an alternative, further embodiments may include that each of the plurality of blower blades extend from the internal surface to the external surface.

In addition to one or more of the features described above, or as an alternative, further embodiments may include that the axial passageway is located at the forward end and extends into the blower.

In addition to one or more of the features described above, or as an alternative, further embodiments may include that the axial passageway extends from the forward end to the aft end.

In addition to one or more of the features described above, or as an alternative, further embodiments may include a seat located in the axial passageway.

In addition to one or more of the features described above, or as an alternative, further embodiments may include: a frame; a first forward thrust bearing; and a second forward thrust bearing. The forward disc further includes a forward surface and the aft disc further includes an aft surface. The first forward thrust bearing is located between the forward surface of the forward disc and the frame and the second forward thrust bearing is located between the aft surface of the aft disc and the frame.

In addition to one or more of the features described above, or as an alternative, further embodiments may include that the forward surface is a thrust bearing runner for the first forward thrust bearing.

In addition to one or more of the features described above, or as an alternative, further embodiments may include that the aft surface is a thrust bearing runner for the second forward thrust bearing.

In addition to one or more of the features described above, or as an alternative, further embodiments may include: a frame; and a first journal bearing located between the blower shaft and the frame.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

The embodiments of the method and apparatus detailed herein relate to a high speed turbo-alternator with an integrated cooling fan. Integrated refers to the fact that the cooling fan, referred to herein as blower blades, is integrated within a flange of the thrust bearing runner rather than being an external fan. By being integrated into the flange of the thrust bearing runner, this removes heat from the blower itself while also removing heat from thrust bearings abutting two sides of the flange.

Figure 1:
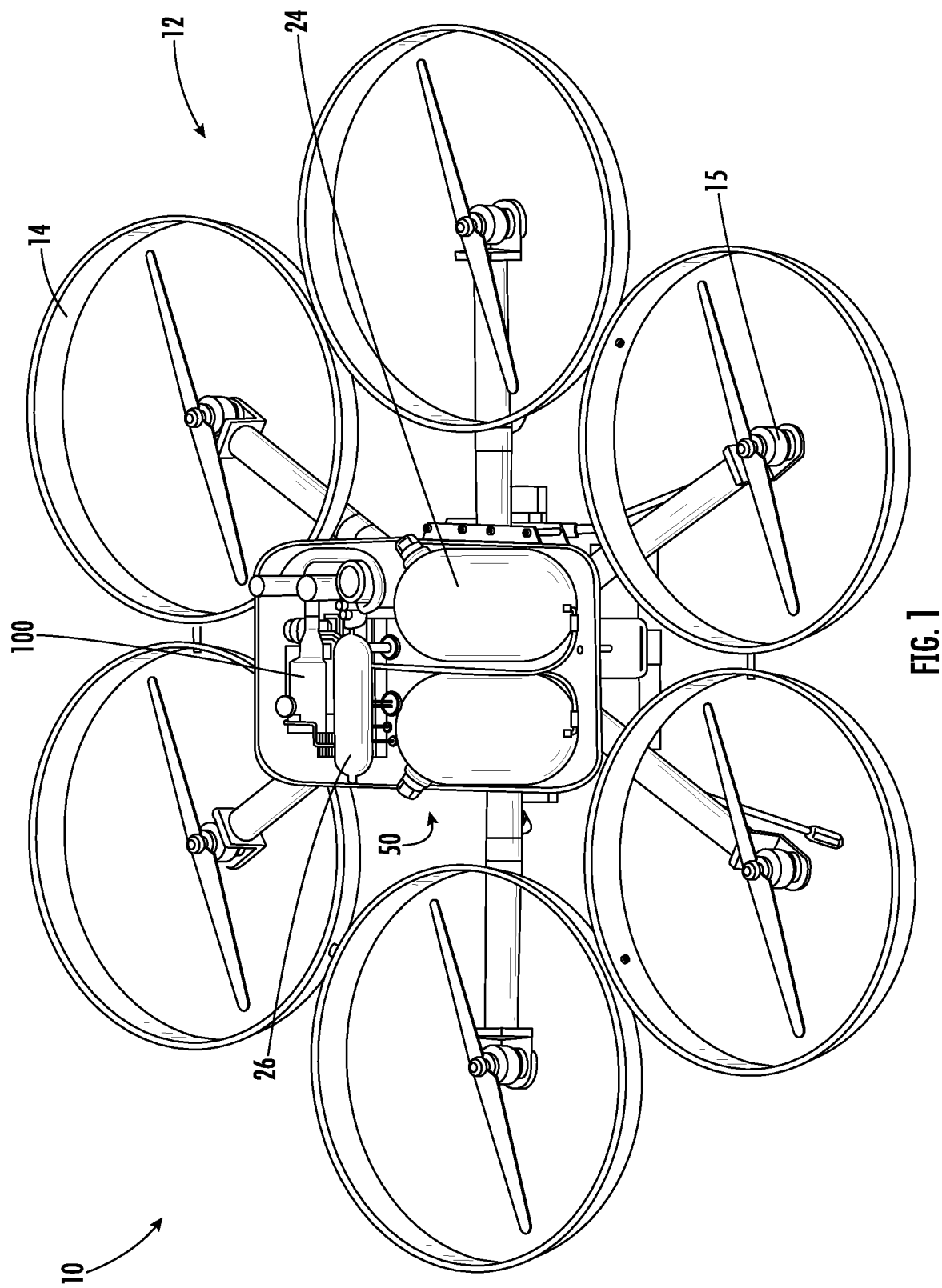
FIG. 1 is an isometric view of an unmanned aerial vehicle including a power generation system, according to an embodiment of the present disclosure.

Referring to FIG. 1, an isometric view of an unmanned aerial vehicle (UAV) 10 is illustrated in accordance with an embodiment of the present disclosure. The UAV 10 includes a propulsion/lift system 12, for example a plurality of lift rotors 14, operably connected to an electrical power generation system 50, which includes a micro-turbine alternator system 100. In an embodiment, the micro-turbine alternator system 100 is a high efficiency Brayton cycle micro-turbine alternator. The UAV 10 includes a propulsion system having electric motors 15 and lift rotors 14 associated with each electric motor 15. Each lift rotor 14 is operably connected to the electric motor 15 that is configured to rotate the lift rotor 14 using electrical power generated by the micro-turbine alternator system 100 of the electrical power generation system 50. The micro-turbine alternator system 100 is configured to convert fuel to electrical power to power at least the electric motors 15 of the lift rotors 14. The fuel is provided from one or more fuel storage tanks 24 operably connected to the micro-turbine alternator system 100. In some embodiments, the fuel utilized is JP-8. The micro-turbine alternator system 100 may utilize compressed air provided from a compressed air tank 26 at 4500 pounds per square inch gauge (psig) and regulated to about 750 psig. The compressed air from the compressed air tank 26 of FIG. 1 may be utilized to provide the motive pressure required to drive the liquid fuel through a turbine speed control valve (not shown) and into a decomposition chamber. Alternatively, an electric driven pump may be used in place of the compressed air. It is understood that while a decomposition chamber is illustrated and described, the embodiments disclosed herein may be applicable to micro-turbine alternator systems having combustion chambers.

Figure 2:
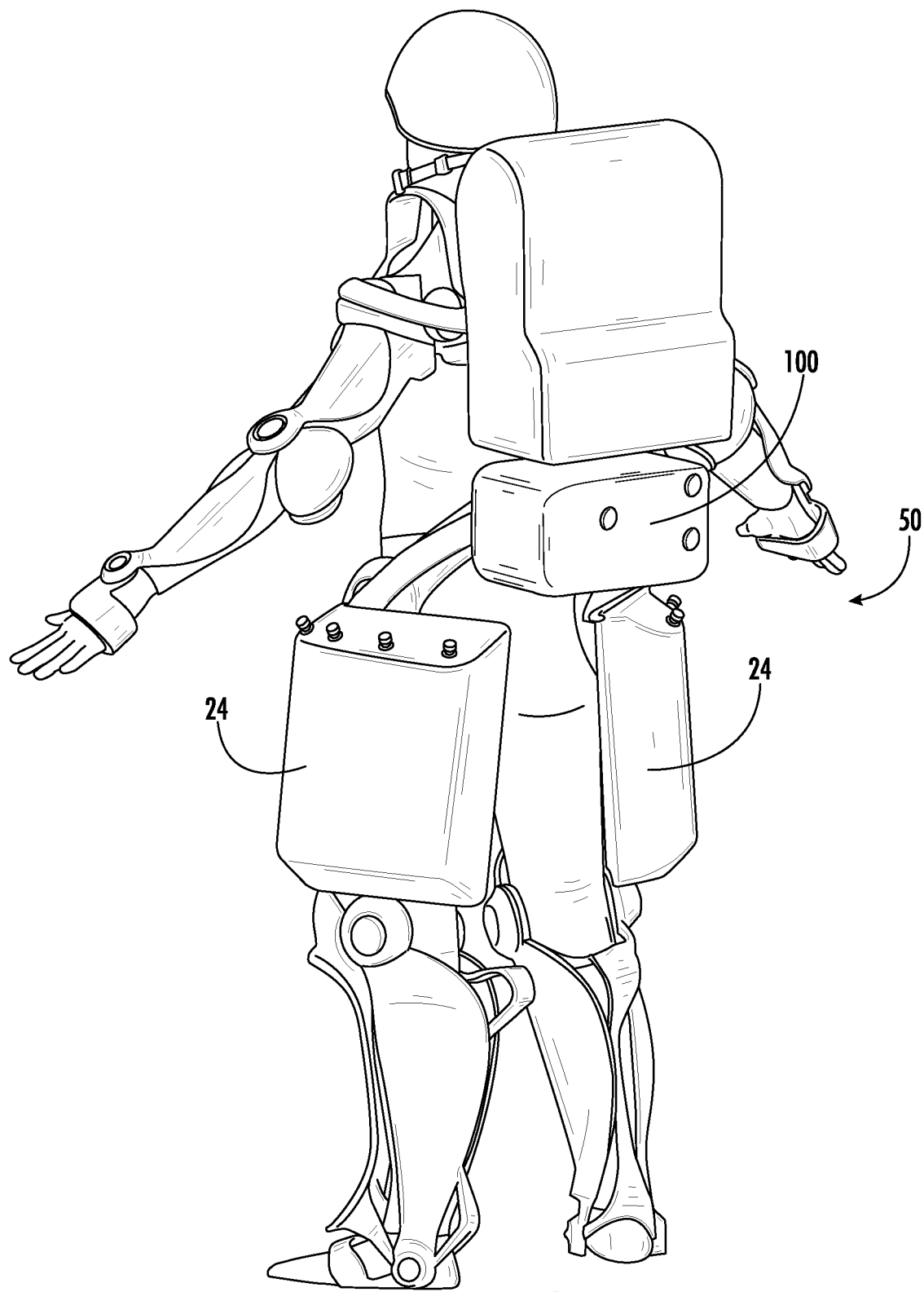
FIG. 2 is an isometric view of a powered suit including a power generation system, according to an embodiment of the present disclosure.

Referring now to FIG. 2, with continued reference to FIG. 1, an isometric view of an electrically-powered suit 34 is illustrated in accordance with an embodiment of the present disclosure. While in FIG. 1, the micro-turbine alternator system 100 is described as utilized in a UAV 10, the micro-turbine alternator system 100 disclosed herein may be readily applied to other systems, and may be utilized in, for example, an electrically-powered suit 34, as shown in FIG. 2.

The electrically-powered suit 34 is operably connected to an electrical power generation system 50, which includes a micro-turbine alternator system 100. The micro-turbine alternator system 100 is configured to convert fuel to electrical power to power the electrically-powered suit 34. The fuel is provided from one or more fuel storage tanks 24 operably connected to the micro-turbine alternator system 100. In some embodiments, the fuel utilized is JP-8. The fuel storage tanks 24 may be located on legs of the electrically-powered suit 34, as illustrated in FIG. 2.

It is understood that the micro-turbine alternator system 100 is not limited to a UAV 10 and an electrically-powered suit 34 application, and the micro-turbine alternator system 100 may be applied to other systems not disclosed herein.

Figure 3:
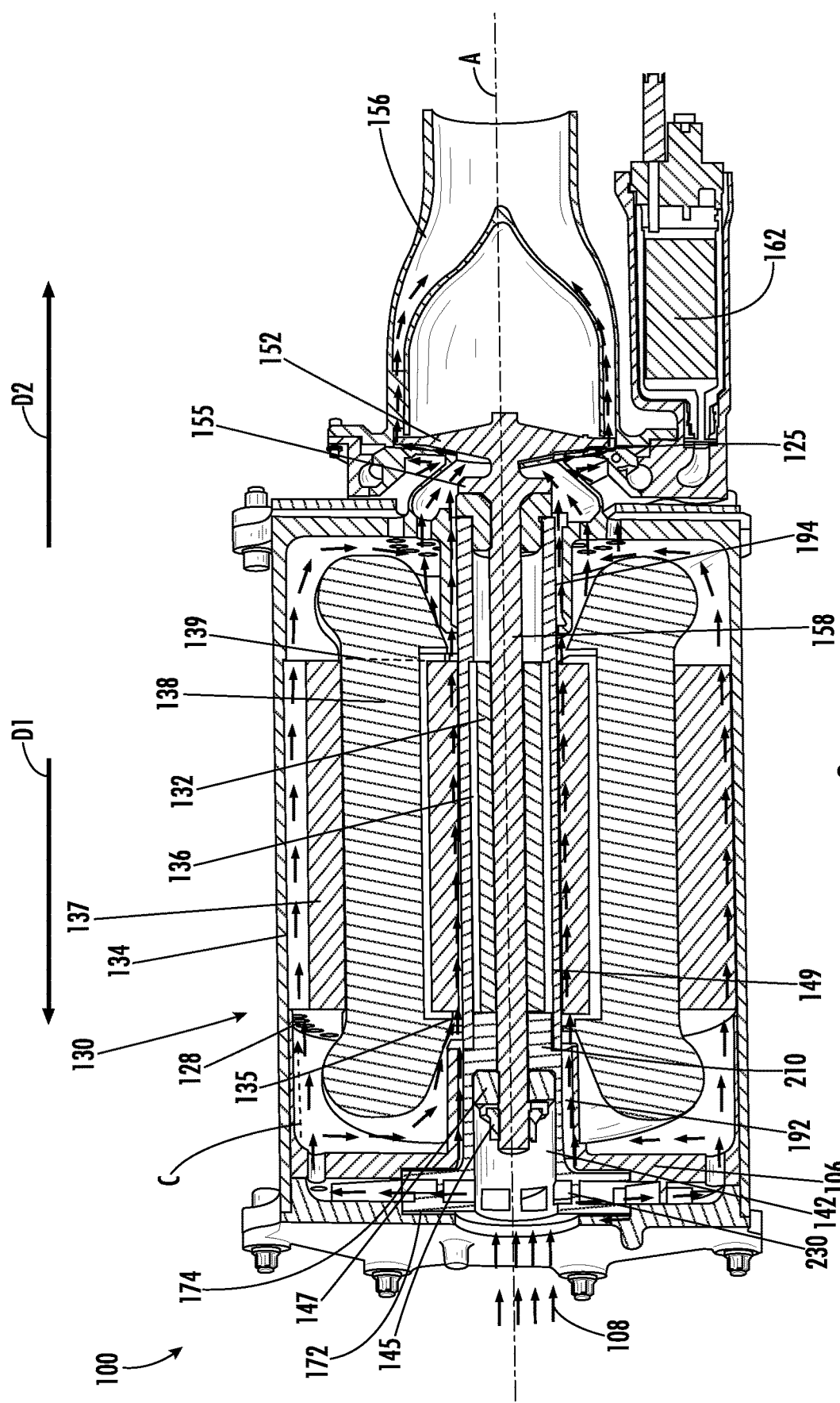
FIG. 3 is an isometric cut-away view of a micro-turbine alternator for use in the power generation system of FIGS. 1 and 2, according to an embodiment of the present disclosure.

Referring now to FIG. 3, an isometric cut-away view of the micro-turbine alternator system 100 is illustrated, in accordance with an embodiment of the present disclosure. The micro-turbine alternator system 100 includes a blower 142 and a turbine 152. The blower 142 and the turbine 152 are oriented along a central longitudinal axis A of the micro-turbine alternator system 100. The micro-turbine alternator system 100 also includes an electric generator 130 located between the blower 142 and the turbine 152 as measured along the central longitudinal axis A.

Advantageously, by locating the electric generator 130 between the blower 142 and the turbine 152, the overall physical size of the micro-turbine alternator system 100 is reduced. As a result, the micro-turbine alternator system 100 according to one or more embodiments may be used in a UAV 10, an electrically-powered suit 34, or another system that benefits from untethered, lightweight power generation.

The micro-turbine alternator system 100 also includes an alternator stator cooling heat exchanger 128 configured to utilize airflow from the blower 142 to cool the electric generator 130. The alternator stator cooling heat exchanger 128 may encircle or enclose the electric generator 130 and may be configured to pass airflow from the blower 142 through or around the electric generator 130. Advantageously, by locating the electric generator 130 between the blower 142 and the turbine 152, moderately cool air in the core flow path C from the blower 142 is forced through the alternator stator cooling heat exchanger 128 and heat may be drawn out of the electric generator 130 and to the airflow within the alternator stator cooling heat exchanger 128.

The electric generator 130 may be a permanent magnet alternator, an induction generator, a switched reluctance generator, a wound field generator, a hybrid generator, or any other type of alternator known to one of skill in the art. As illustrated in FIG. 3, the electric generator 130 may be a permanent magnet alternator that includes a rotor element 132 and a stator element 134 radially outward from the rotor element. In other words, the rotor element 132 is located radially inward from the stator element 134 as measured relative to the central longitudinal axis A. It is understood that the embodiments disclosed herein may be applicable to a rotor element 132 that is located radially outward from the stator element 134. The rotor element 132 may be rotated around the central longitudinal axis A to generate electricity.

The rotor element 132 includes an annular base member 135, an annular array of permanent magnets 136 that are respectively coupled to an outer diameter of the annular base member 135. The rotor element 132 may include a magnet retention band that fits over an outer diameter of the permanent magnet 136, and keeps the permanent magnet 136 on the rotating annular base member 135. In accordance with further embodiments, the stator element 134 includes a hub 137, a plurality of spokes 139 extending radially inward from the hub 137 and conductive elements 138 that are wound around the spokes 139 to form windings. When the rotor element 132 is rotated around the central longitudinal axis A, a rotating flux field is generated by the permanent magnets 136 and this rotating flux field generates an alternating current in the conductive elements 138 to generate electricity for use by the UAV 10 of FIG. 1 or the electrically-powered suit 34 of FIG. 2.

The micro-turbine alternator system 100 includes a decomposition chamber 162, in which a mono-propellant is decomposed, with the decomposition products utilized to drive an electric generator 130. In some embodiments, the fuel utilized in the decomposition chamber 162 is AF-M315E or Hydrazine. The micro-turbine alternator system 100 converts the energy of the decomposition products into electrical power by urging the decomposition products through the turbine 152, which are operably connected to and configured to rotate the rotor element 132 of the electric generator 130. The electrical energy generated by the electric generator 130 may then be rectified via a generator rectifier (not shown) and utilized by the propulsion/lift system 12 of FIG. 1 or the electrically-powered suit 34 of FIG. 2. The compressed air from the compressed air tank 26 of FIG. 1 may be utilized to provide the motive pressure required to drive the liquid fuel through a turbine speed control valve (not shown) and into the decomposition chamber 162.

The blower 142 is located forward of the turbine 152 as measured along the central longitudinal axis A. In other words, the turbine 152 is located aft of the blower 142 as measured along the central longitudinal axis A. The forward direction D1 and the aft direction D2 are illustrated in FIG. 3.

The micro-turbine alternator system 100 includes a blower shaft 210 oriented along and co-axial to the central longitudinal axis A. The blower shaft 210 may be attached or operably connected to the blower 142. The micro-turbine alternator system 100 includes a turbine shaft 158 oriented along and co-axial to the central longitudinal axis A. In an embodiment, the turbine shaft 158 is a tie bolt and is used to compress a rotating group of components including the blower 142, transfer tube 149, the blower shaft 210, a first journal bearing 192, and a second journal bearing 194 in the axial direction, causing the multi-segment shaft to act as a single stiff shaft. The turbine shaft 158 may secure to the blower shaft 210 using a nut 145 and a thermal insulator 147. The turbine shaft 158 may be attached or operably connected to the turbine 152.

The blower shaft 210 extends in the aft direction D2 away from the blower 142. The turbine shaft 158 extends in the forward direction D1 away from the turbine 152 and through the electric generator 130 to operably connect to the blower shaft 210. In an embodiment, the turbine shaft 158 is located radially inward of the rotor element 132.

The turbine shaft 158 and the blower shaft 210 are configured to rotate in unison. Thus, when decomposition chamber exhaust from the decomposition chamber 162 drives rotation of the turbine 152, the blower shaft 210 rotates. The rotation of the blower shaft 210 drives rotation of the blower 142.

The blower shaft 210 and the turbine shaft 158 are coaxial and rotate via the bearing systems about the central longitudinal axis A, which is colinear with their longitudinal axes. The bearing system includes a first journal bearing 192 located between the blower 142 and the frame 106 of the micro-turbine alternator system 100. The bearing system includes a second journal bearing 194 located between the transfer tube 149 and the frame 106 of the micro-turbine alternator system 100.

Advantageously, locating the electric generator 130 between the blower 142 and the turbine 152 provides for very effective bearing placement around the blower shaft 210 and transfer tube 149, which increases the stiffness of the combination of the blower shaft 210, transfer tube 149, and turbine shaft 158. The increased stiffness of this combination of rotating components allows for an increase in the critical speed of the turbine shaft 158.

Also, advantageously, by locating the electric generator 130 between the blower 142 and the turbine 152, the alternator stator cooling heat exchanger 128 helps reduce the operating temperature of the electric generator 130, while the airflow through the alternator stator cooling heat exchanger 128 also experiences a pressure drop. This pressure drop through the alternator stator cooling heat exchanger 128 forces some of the airflow from the blower 142 through the rotor element 132 and to a stator gap between the rotor element 132 and the stator element 134, which provides cooling air to the rotor element 132, the first journal bearing 192, and the second journal bearing 194.

The transfer tube 149 extends from the blower 142 through the electric generator 130 to a turbine shaft disc 155. The transfer tube 149 is co-axial with the electric generator 130. The rotor element 132 with the annular base member 135 and the annular array of permanent magnets 136 are located radially inward of the transfer tube 149 measured relative to the central longitudinal axis A. The stator element 134 with the hub 137, the conductive elements 138, and the spokes 139 are located radially outward of the transfer tube 149 as measured relative to the central longitudinal axis A.

The turbine 152 may include rows of rotor assemblies (shown schematically) that carry airfoils that extend into the core flow path C. For example, the turbine 152 can carry a plurality of rotating blades 125. The blades 125 of the turbine 152 extract energy (in the form of pressure) from the core airflow that is communicated through the micro-turbine alternator system 100 along the core flow path C.

The blower 142 may include rows of rotor assemblies (shown schematically) that carry airfoils that extend into the core flow path C. For example, the blower 142 can carry a plurality of rotating blower blades 230. The blower blades 230 of the blower 142 convert rotational mechanical energy (in the form of torque and rotational speed) into pneumatic energy (in the form of pressure) from the core airflow that is communicated through the micro-turbine alternator system 100 along the core flow path C.

The micro-turbine alternator system 100 may also include a first forward thrust bearing 172 and a second forward thrust bearing 174 aft of the first forward thrust bearing 172. The first forward thrust bearing 172 is located between the blower 142 and the frame 106. The second forward thrust bearing 174 is located between the blower 142 and the frame 106.

Figure 4:
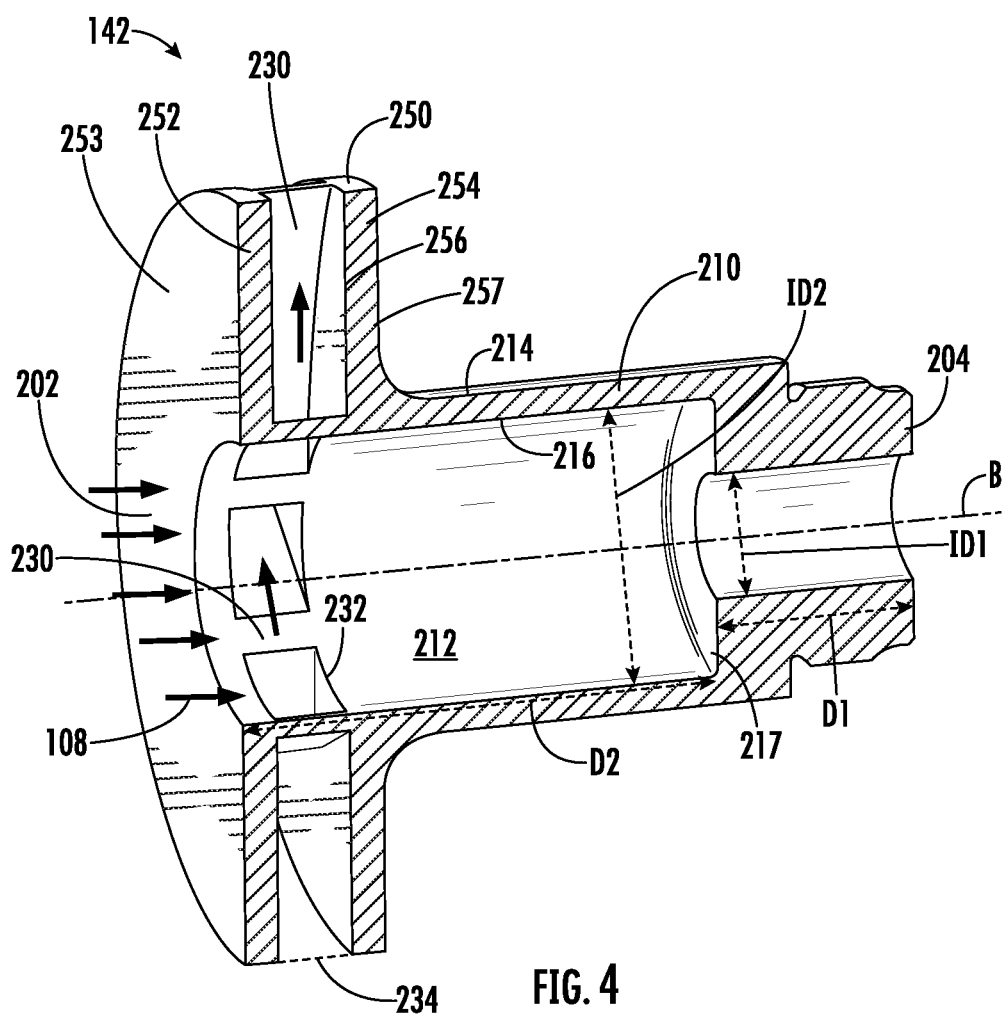
FIG. 4 is an enlarged isometric side cut-away view of a blower of the micro-turbine alternator of FIG. 3, according to an embodiment of the present disclosure.
Figure 5:
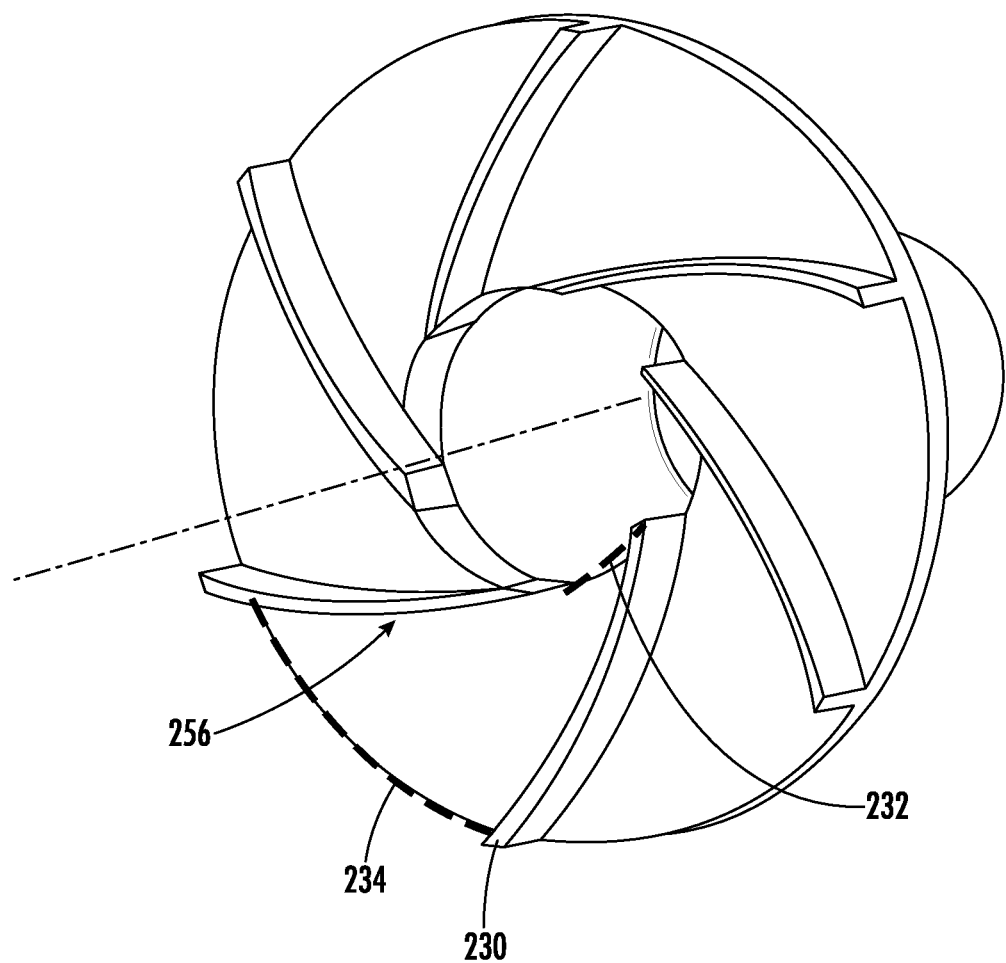
FIG. 5 is an enlarged isometric axial cut-away view of a blower of the micro-turbine alternator of FIG. 3, according to an embodiment of the present disclosure.

Referring now to FIGS. 4 and 5, with continued reference to FIGS. 1-3, an isometric side cutaway view of the blower 142 is illustrated in FIG. 4 and an isometric axial cutaway view of the blower 142 is illustrated in FIG. 5, in accordance with an embodiment of the present disclosure.

The blower 142 extends from a forward end 202 to an aft end 204. The aft end being located opposite of the forward end 202, as illustrated in FIG. 4. When installed in the micro-turbine alternator system 100 of FIG. 3, the forward end 202 is located forward of the aft end 204, as measured along the central longitudinal axis A. In other words, the aft end 204 is located aft of the forward end 202, as measured along the central longitudinal axis A.

The blower 142 includes a blower shaft 210 at the aft end 204 and a flange 250 at the forward end 202. The blower shaft 210 extends from the aft end 204 to the flange 250 and the flange 250 extends from the forward end 202 to the blower shaft 210. The blower shaft 210 is coaxial to a blower longitudinal axis B. The blower shaft 210 rotates about the blower longitudinal axis B. When the blower 142 is installed within the micro-turbine alternator system 100 of FIG. 3, the blower longitudinal axis B is colinear with the central longitudinal axis A. In other words, the blower longitudinal axis B and the central longitudinal axis A are the same axis when the blower 142 is installed within the micro-turbine alternator system 100 of FIG. 3.

The blower 142 includes an external surface 214 and an internal surface 216. The external surface 214 is radially outward from the internal surface 216. The blower 142 includes an axial passageway 212 formed therein. The axial passageway 212 is located at the forward end 202 and extends into the blower 142. The internal surface 216 defines the axial passageway 212 that extends from the forward end 202 to the aft end 204. An inner diameter ID1, ID2 of the passageway may vary in size between the forward end 202 and the aft end 204. The axial passageway 212 is co-axial with the blower longitudinal axis B. The axial passageway 212 may be tubular in shape and configured to fit the turbine shaft 158 (See FIG. 3). In other words, the turbine shaft 158 is configured to fit within the axial passageway 212.

A seat 217 is interposed in the axial passageway 212 between the aft end 204 and the forward end 202. The axial passageway 212 has a first inner diameter ID1 from the aft end 204 to the seat 217 and a second inner diameter ID2 from the forward end 202 to the seat 217. The first inner diameter ID1 is less than the second inner diameter ID2. The seat 217 provides a surface for the thermal insulator 147 to rest upon when the nut 145 is secured to the turbine shaft 158, thus interlocking the blowers 142 and the turbine 152 together.

The flange 250 includes a forward disc 252 and an aft disc 254. The forward disc 252 is located at the forward end 202 and the aft disc 254 is connected to the blower shaft 210. The aft disc 254 may be attached to the forward disc 252 through one or more blower blades 230.

The blower 142 includes a plurality of blades 230 circumferentially encircling the internal surface 216. Each of the plurality of blades 230 extend from the internal surface 216 to the external surface 214. The blades 230 of the blower 142 transfer mechanical energy of the rotating shaft into pneumatic energy in the fluid stream (in the form of dynamic pressure) by blown and accelerating the airflow in the core airflow path C. The blades 230 may be contoured between the internal surface 216 to the external surface 214 to appropriately blow and accelerate the airflow in the core airflow path C as required.

The blower blades 230 extend from the forward disc 252 to the aft disc 254. The blower blades 230 may extend from the internal surface 216 to the external surface 214. The forward disc 252 and the aft disc 254 are in a facing spaced relationship partially at least partially defining a radial passageway 256 therebetween.

Radial passageways 256 are defined between the forward disc 252, the aft disc 254, and the blower blades 230. Each radial passageways 256 includes a blower inlet 232 in the internal surface 216 and a blower outlet 234 in the external surface 214 of the flange 250. Each radial passageway 256 is fluidly connected to the axial passageway 212.

Air 108 is drawn into the blower 142 through the axial passageway 212 at the forward end 202, then from the axial passageway 212 the air 108 is drawn through the blower inlet 232 into the radial passageways 256 and then out of the radial passageways 256 through the outlet 234. Advantageously, by pulling air 108 through the axial passageway formed within the blowers 142, the air 108 cools the blower 142, while being blown.

The blower 142 is a monolithic structure rather than being assembled from separate individually formed components that are then assembled. The term monolithic may be defined as an object that is cast or formed as single piece without joints or seams. In other words, the blower 142 is formed as a single piece comprising a unitary structure. In an embodiment, the blower 142 has no joints or seams. The blower 142 may be manufactured or formed via additive manufacturing. Additive manufacturing may include, but is not limited to 3D printing, laser powder bed fusion (L-PBF) additive manufacturing, investment casting (using the rapid prototype method) or any other additive manufacturing technique known to one of skill in the art.

The first forward thrust bearing 172 is located between a forward surface 253 of the forward disc 252 and the frame 106. The forward surface 253 is a thrust bearing runner for the first forward thrust bearing 172. The second forward thrust bearing 174 is located between an aft surface 257 of the aft disc 254 and the frame 106. The aft surface 257 is a thrust bearing runner for the second forward thrust bearing 177. The first journal bearing 192 is located between the external surface 214 and the frame 106 of the micro-turbine alternator system 100.

Technical effects and benefits of the features described herein include providing cooling to a blower and a thrust bearing by internalizing blower blade within the blower between thrust bearings to simultaneously cool the blower and adjacent thrust bearings as the air blows through the blower.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A blower, comprising:
a forward end;
an aft end located opposite the forward end;
a shaft located at the aft end;
a flange located at the forward end;
an internal surface defining an axial passageway within the blower;
an external surface radially outward of the internal surface;
one or more radial passageway formed within the flange and fluidly connected to the axial passageway, the radial passageway extending from the internal surface to the external surface; and
a plurality of blower blades located within the flange and defining the radial passageway;
wherein the flange further comprises:
a forward disc located at the forward end and includes a forward surface;
an aft disc connected to the shaft, the aft disk being in a facing spaced relationship with the forward disk and at least partially defining the one or more radial passageways therebetween; and
wherein the forward disc includes a forward surface and the aft disc further comprises an aft surface,
wherein the forward surface is a thrust bearing runner for a first forward thrust bearing, and wherein the aft surface is a thrust bearing runner for a second forward thrust bearing.

2. The blower of claim 1, wherein each of the plurality of blower blades extend from the forward disc to the aft disc.

3. The blower of claim 1, wherein each of the plurality of blower blades extend from the internal surface to the external surface.

4. The blower of claim 1, wherein the axial passageway is located at the forward end and extends into the blower.

5. The blower of claim 1, wherein the axial passageway extends from the forward end to the aft end.

6. The blower of claim 5, further comprising a seat located in the axial passageway.

7. An electrical power generation system, comprising:
a micro-turbine alternator, comprising:
a decomposition chamber;
a turbine driven by combustion gases from the decomposition chamber;
a blower operably connected to the decomposition chamber to provide a blown airflow thereto;
one or more shafts connecting the turbine to the blower such that rotation of the turbine drives rotation of the blower; and
an electric generator disposed along the one or more shafts such that electrical power is generated via rotation of the one or more shafts,
wherein the blower comprises
a forward end;
an aft end located opposite the forward end;
a shaft located at the aft end;
a flange located at the forward end;
an internal surface defining an axial passageway within the blower;
an external surface radially outward of the internal surface;
one or more radial passageway formed within the flange and fluidly connected to the axial passageway, the radial passageway extending from the internal surface to the external surface; and
a plurality of blower blades located within the flange and defining the radial passageway.

8. The electrical power generation system of claim 7, wherein the flange further comprises:
a forward disc located at the forward end; and
an aft disc connected to the shaft, the aft disc being in a facing spaced relationship with the forward disk and at least partially defining the one or more radial passageways therebetween.

9. The electrical power generation system of claim 8, wherein each of the plurality of blower blades extend from the forward disk to the aft disc.

10. The electrical power generation system of claim 7, wherein each of the plurality of blower blades extend from the internal surface to the external surface.

11. The electrical power generation system of claim 7, wherein the axial passageway is located at the forward end and extends into the blower.

12. The electrical power generation system of claim 7, wherein the axial passageway extends from the forward end to the aft end.

13. The electrical power generation system of claim 12, further comprising a seat located in the axial passageway.

14. The electrical power generation system of claim 7, further comprising:
a frame;
a first forward thrust bearing; and
a second forward thrust bearing,
wherein the forward disc further comprises a forward surface and the aft disc further comprises an aft surface, and
wherein the first forward thrust bearing is located between the forward surface of the forward disc and the frame and the second forward thrust bearing is located between the aft surface of the aft disc and the frame.

15. The electrical power generation system of claim 14, wherein the forward surface is a thrust bearing runner for the first forward thrust bearing.

16. The electrical power generation system of claim 14, wherein the aft surface is a thrust bearing runner for the second forward thrust bearing.

17. The electrical power generation system of claim 7, further comprising:
- a frame; and
- a first journal bearing located between the blower shaft and the frame.

\* \* \* \* \*